US008735817B2

(12) United States Patent
Thomas et al.

(10) Patent No.: US 8,735,817 B2
(45) Date of Patent: May 27, 2014

(54) CLIP-ON TARGET DESIGNATION SENSOR TO NIGHT VISION GOGGLES

(75) Inventors: Nils I. Thomas, Eagle Rock, VA (US); Daniel M. Thorsen, Roanoke, VA (US); Kevin P. Hines, Daleville, VA (US)

(73) Assignee: Exelis, Inc., McLean, VA (US)

( * ) Notice: Subject to any disclaimer, the term of this patent is extended or adjusted under 35 U.S.C. 154(b) by 263 days.

(21) Appl. No.: 13/156,696

(22) Filed: Jun. 9, 2011

(65) Prior Publication Data

US 2012/0313007 A1 Dec. 13, 2012

(51) Int. Cl.
G02F 1/01 (2006.01)
H01L 31/00 (2006.01)
G02B 23/12 (2006.01)
H01J 31/50 (2006.01)

(52) U.S. Cl.
CPC .............. G02B 23/125 (2013.01); G02B 23/12 (2013.01); H01J 31/507 (2013.01)
USPC ....................................................... 250/330

(58) Field of Classification Search
CPC ...... G02B 23/12; G02B 23/125; H01J 31/507
USPC .............. 250/458.1, 492.1, 330–334, 339.14, 250/341.1, 341.8
See application file for complete search history.

(56) References Cited

U.S. PATENT DOCUMENTS

| 6,045,677 | A * | 4/2000 | Beetz et al. | 205/50 |
| 7,483,213 | B2 * | 1/2009 | Pochapsky | 359/618 |
| 2002/0030163 | A1 | 3/2002 | Zhang et al. | |
| 2005/0083567 | A1 | 4/2005 | Chun Liu et al. | |
| 2006/0030738 | A1 * | 2/2006 | Vanmaele et al. | 568/9 |
| 2006/0081793 | A1 * | 4/2006 | Nestorovic et al. | 250/580 |
| 2006/0153558 | A1 * | 7/2006 | Tan et al. | 396/155 |
| 2006/0285350 | A1 * | 12/2006 | Wang | 362/555 |
| 2008/0157000 | A1 * | 7/2008 | Shamir et al. | 250/473.1 |
| 2009/0224154 | A1 * | 9/2009 | Jancic et al. | 250/330 |
| 2010/0128135 | A1 * | 5/2010 | Filipovich et al. | 348/217.1 |

FOREIGN PATENT DOCUMENTS

WO  WO 2008/109978  9/2008

OTHER PUBLICATIONS

Porrachia, Isabelle, Authorized Officer of EPO, International Search Report of PCT/US2012/039825, Oct. 5, 2012.

* cited by examiner

Primary Examiner — David Porta
Assistant Examiner — Abra Fein
(74) Attorney, Agent, or Firm — RatnerPrestia

(57) ABSTRACT

A target engagement system includes a night vision goggle system operating within a predetermined wavelength band, and a laser module projecting light onto a target, where the light operates at a wavelength that is outside of the predetermined wavelength band. Also included is a receive system for receiving the light reflected from the target and converting the light into a wavelength within the predetermined wavelength band. In this manner, the receive system provides the converted light to the night vision goggle system, and the night vision goggle system amplifies the converted light for viewing by a user. The receive system includes a clip-on device for removably attaching the receive system between the target and the night vision goggle system. The receive system includes an up-converting phosphor layer for up-converting the received light into a wavelength detectable by the night vision goggle system.

22 Claims, 4 Drawing Sheets ns.com/patents/US8735817B2
CLIP-ON TARGET DESIGNATION SENSOR TO NIGHT VISION GOGGLES

FIELD OF THE INVENTION

The present invention, in general, relates to night vision goggles and, more particularly, the present invention relates to laser target designators for night vision goggles.

BACKGROUND OF THE INVENTION

Detecting human targets is a primary task of an infantry soldier. Completing this task at night poses peculiar difficulties to the soldier. First, the soldier must be able to see the target and then aim his weapon at the target to ensure hitting the target. Soldiers are outfitted with night vision goggles (NVGs) that permit target detection at night. In order to engage the target, the soldier has a laser aiming light mounted on, and boresighted to his weapon. The aiming light provides energy at a particular wavelength that the image intensifier ($I^2$) tube in the NVG can detect. Thus, the soldier sees the target with the NVG. He also sees the aiming light through his night vision goggle and, thus, can move the aiming light onto the target. Since the aiming light is boresighted with his weapon, he can pull the trigger when viewing the aiming light on the target.

The aiming light, which is sensed by the night vision goggle is not visible to the human eye. In the past, this combination enabled the advantage of covert operation; e.g. the solder can see the enemy, but the enemy cannot see the soldier. Today, as a countermeasure, the enemy is capable of fielding a night vision goggle that can detect the aiming light. Consequently, covert operation is no longer possible. Presently, when a soldier turns on his aiming light, the enemy can see him and can engage to target him.

SUMMARY OF THE INVENTION

To meet this and other needs, and in view of its purposes, the present invention provides a laser projecting light. The laser projecting light includes: a laser module for projecting light onto a target. The light operates at a wavelength outside of a wavelength band detectable by a night vision goggle system. The laser module is removably attached to a weapon system, and is boresighted to the weapon system. The light may operate at a wavelength longer than 950 nanometers. The light may operate at a short wave infrared (SWIR) wavelength. The light may also operate at a wavelength shorter than 400 nanometers.

Another embodiment of the present invention is a target engagement system including a night vision goggle system operating within a wavelength band, a laser module for projecting light onto a target, the light operating at a wavelength and outside of the wavelength band. Also included is a receive system for receiving the light reflected from the target and converting the light into a wavelength within the wavelength band. The receive system provides the converted light to the night vision goggle system, and the night vision goggle system amplifies the converted light for viewing by a user.

The receive system includes a clip-on device for removably attaching the receive system between the target and the night vision goggle system. The receive system is configured to up-convert the received light into a wavelength detectable by the night vision goggle system.

The receive system may include a relay objective, a fold mirror and an insertion beam combiner for relaying the received light to the night vision goggle system.

The receive system may include a fiber optic bundle for relaying the converted light directly into the night vision goggle system.

In the target engagement system, the light reflected from the target is invisible to the user, and the converted light is visible to the user.

Yet another embodiment of the present invention is a target engagement system including a night vision goggle system operating within a wavelength band; a laser module, boresighted to a weapon system, for projecting light onto a target, the light operating at a wavelength outside of the wavelength band detectable by the night vision goggle system; a receive system for receiving light reflected from the target and converting the light into a wavelength within the wavelength band; and a clip-on device for removably disposing the receive system between the target and the night vision goggle system. The receive system sends the converted light to the night vision goggle system, and the night vision goggle system amplifies the converted light for viewing by a user.

It is understood that the foregoing general description and the following detailed description are exemplary, but are not restrictive, of the invention.

BRIEF DESCRIPTION OF THE FIGURES

The invention may be understood from the following detailed description when read in connection with the accompanying figures.

DETAILED DESCRIPTION OF THE INVENTION

Figure 1:
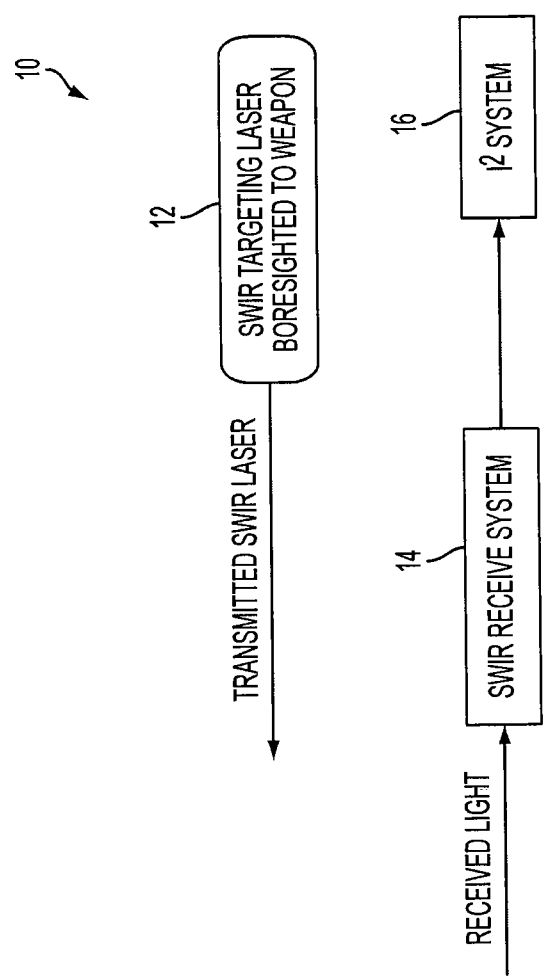
FIG. 1 is a block diagram of a covert target designation system, in is accordance with an embodiment of the present invention.

Referring first to FIG. 1, there is shown an embodiment of the present invention, referred to herein as a covert target designation system 10. The system includes two components: an aiming light module 12 that transmits light which is not detectable by Gen II or Gen III night vision goggles and a clip-on detection device 14 that attaches to a night vision goggle system 16.

A typical light module 12 may include a short wave infrared (SWIR) targeting laser which is boresighted to a soldier's weapon. The aiming light module 12 may includes a battery, a laser and a collimating lens, packaged as a unit and mounted to the weapon, with the aid of a mechanical device to permit attachment and removal from the weapon. The wavelength of the aiming light may be any wavelength longer than 950 nm. It is preferred that a laser be the source of the aiming light, as a laser has a collimated beam, which projects a small spot onto the target at a long range.

The typical laser sight is mounted on the top of a weapon, or on the bottom of the weapon. The laser sight, when properly aligned, places a red dot of light on the target, where the bullet will also strike when the gun is fired. Using this type of sight, enables the soldier to rapidly position the weapon and verify the desired target. Using a laser sight enables accurate shots to be fired at distances of more than 50 feet.

The SWIR receive system 14 may be a clip-on device which includes a light collection lens, an up-converting phosphor, and either an optical system or a fiber-optic bundle to relay and invert the image for presentation to an input of the I$^2$ system 16 in the night vision goggle system.

Figure 2:
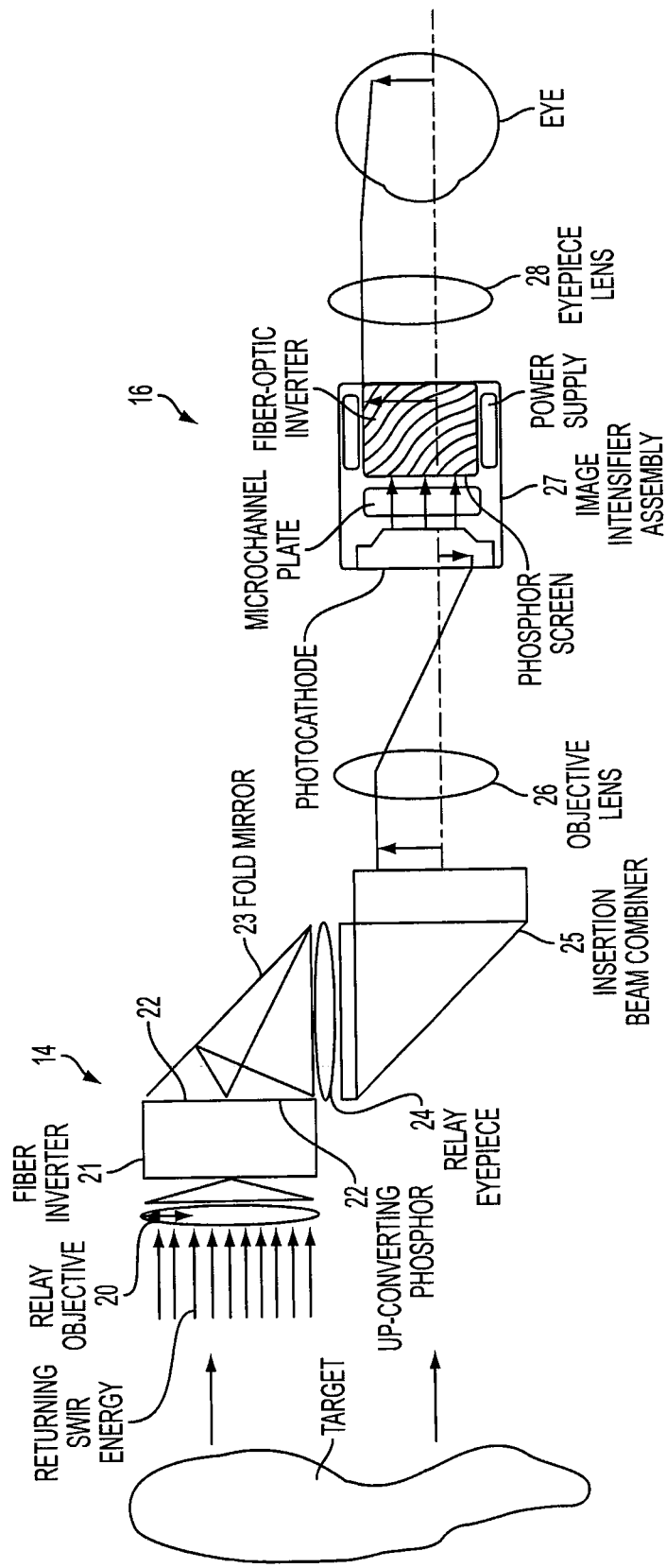
FIG. 2 is a functional block diagram of an SWIR receive system coupled to an $I^2$ night vision goggle system, which forms a part of the covert target designation system of FIG. 1.

Referring next to FIG. 2, the SWIR receive system 14 and the I$^2$ system 16 are shown in greater detail. As shown, the receive system 14 includes relay objective 20, fiber inverter 21, up-converting phosphor surface 22, mirror 23, relay eyepiece 24, and beam combiner 25. The objective lens 20 focuses the received image onto the up-converting phosphor surface 22. The up-converting phosphor detects light from the SWIR targeting laser 12 and up-converts the light to a shorter wavelength. That is, by example, if the laser wavelength is 1.55 nm, then the phosphor surface detects this energy and outputs light at 810 nm wavelength. The 1.55 nm wavelength cannot be detected by the I$^2$ system 16, but the 810 nm is spectrally positioned near the peak sensitivity of the I$^2$ system.

The image formed by the phosphor surface needs to be inverted, translated and collimated, in order to be observed properly by the night vision device. The image inversion is accomplished by depositing an up-converting phosphor layer onto a fiber optic module. The translation and/or the inversion may be accomplished by two fold mirrors 23 and 25, and the collimation is accomplished by a relay eyepiece 24, as shown in FIG. 2. Thus, the image is presented to the NVG I$^2$ system 16, which can amplify and output the out-of band laser wavelength to the soldier as part of his night vision scene.

In order to permit the night vision goggle to view a normal night vision scene, one of the fold mirrors, namely insertion beam combiner 25, is coated as a beam splitter. The coating is designed to be highly reflective at the emission wavelength of the phosphor surface (for example, 95% reflective at 810 nm) and highly transmissive at all other wavelengths.

The night vision goggle (NVG) I$^2$ system 16 is positioned to receive the light reflected from beam combiner 25, including the up-converted returned SWIR energy reflected from the target. Of course, the NVG I$^2$ system 16 also receives light from the target that is transmitted through beam combiner 25. Thus, if the SWIR receive system 14 is disabled, the NVG system 16 remains operational in order to view a target in the normal night vision scene.

As shown, the NVG I$^2$ system 16 includes objective lens 26, image intensifier assembly 27 and eyepiece 28.

In operation, the soldier clips the SWIR receive system 14 onto the front of his night vision goggle. For navigation and detection of targets, he sees only the normal night vision scene. When the out-of-band laser is turned ON, the soldier sees a round dot, wherever the laser reflects off a target. He also sees other objects in the scene by way of the insertion beam combiner 25.

Figure 3:
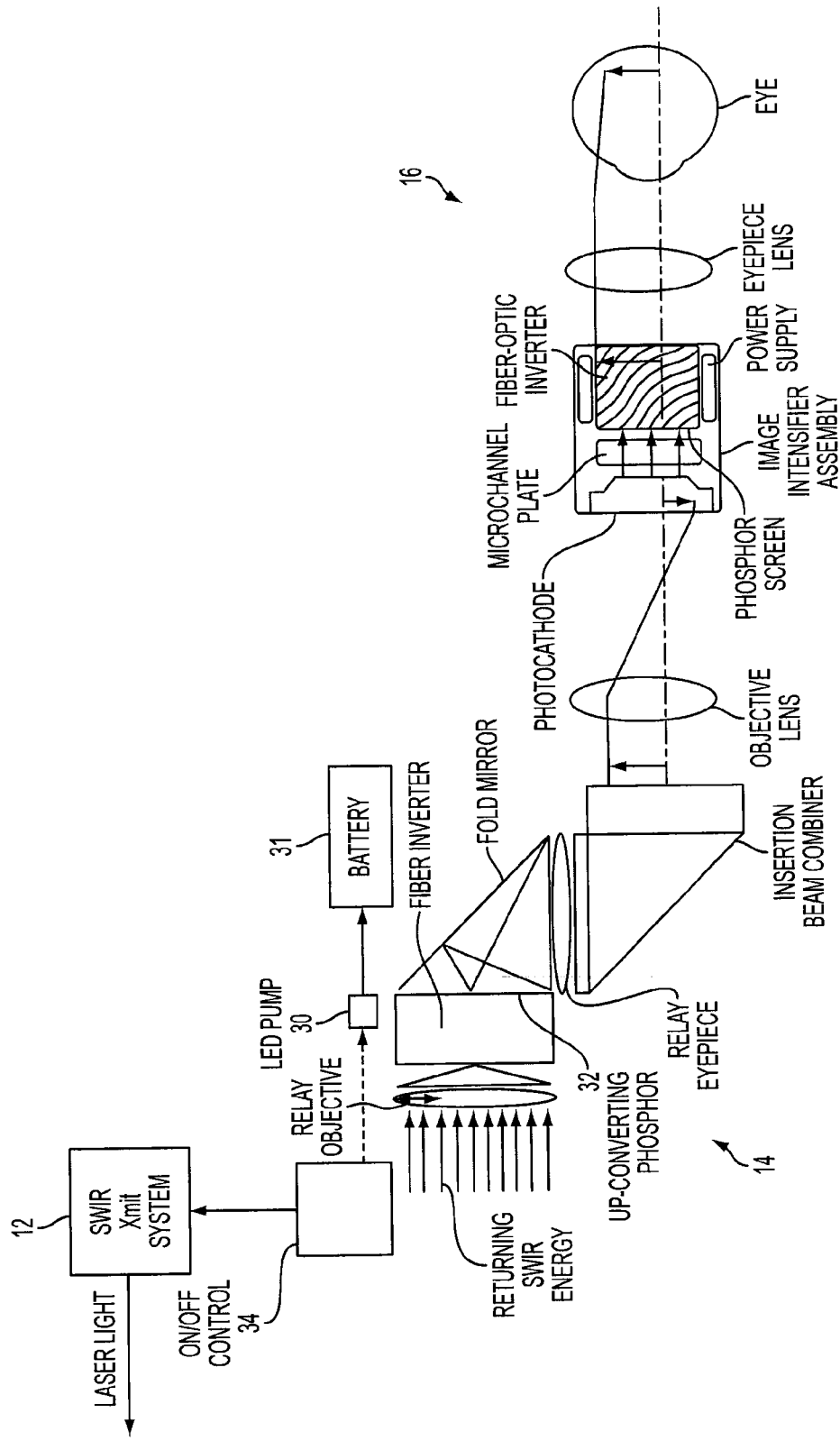
FIG. 3 is a functional block diagram of another SWIR receive system coupled to an $I^2$ night vision goggle system, which forms a part of the covert target designation system of FIG. 1.

Another embodiment of the present invention is shown in FIG. 3, which provides increased efficiency when compared to the embodiment shown in FIG. 2. It will be appreciated that many up-converting phosphors are not very efficient and, thus, the transmitting SWIR laser's power requirement needs to be high, in order to engage the target at normal ranges. In order to reduce power or increase engagement range, an up-converting phosphor, designated as 32, may be "pumped" with light from an LED pump 30. These pumped phosphors are more efficient than passive, non-pumped phosphors.

The LED pump 30 may be placed in a position in which the LED light can strike the up-converting phosphor, as illustrated in FIG. 3. It is desirable that the wavelength of the LED pumping light be blue (<500 nm) and, therefore, not be visible to the NVG I$^2$ system. The LED pump may be powered by a battery 31, such as a small watch battery. The pumping of the LED pump may be, optionally (as shown by a dashed line), synchronized to a laser ON/OFF switch, generally designated as 34, which may also control the SWIR transmit system 12. As a result, power may be saved by shutting off the SWIR transmit light 12 and the LED pump 30.

Figure 4:
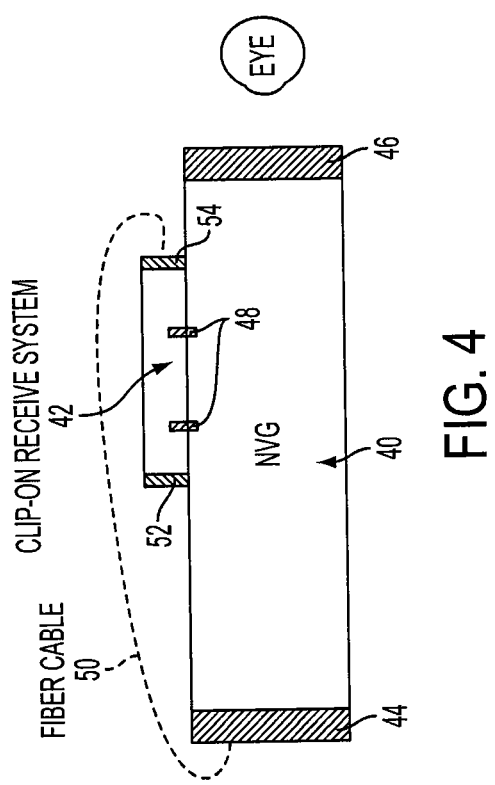
FIG. 4 is a functional block diagram of a clip-on receive system removably connected to an $I^2$ night vision goggle system, in accordance with another embodiment of the present invention.

Yet another embodiment of the present invention is shown in FIG. 4, which functionally illustrates a clip-on receive system 42 that is located on top of, or beside an NVG system 40. The clip-on receive system 42 is removably attached to NVG system 40 by way of clips, or hinges, generally indicated as 48.

Also shown, adjacent to a viewer's eye, are the eyepiece lens of the NVG system and the up-converting phosphor layer of the clip-on receive system, respectively, designated by 46 and 54. Disposed remotely from the viewer's eye are the objective lens of the NVG system and the relay objective of the clip-on receive system, respectively, designated by 44 and 52.

Accordingly, the embodiment shown in FIG. 4 relocates the relay objective and the phosphor layer, so that they are disposed beside the NVG system instead of being disposed in front of the NVG system, the latter NVG system shown in FIGS. 2 and 3. It will be appreciated that clipping onto the front of the objective lens extends the length of the NVG system. As a result, the NVG system is prone to snagging on environmental hazards, such a vines and branches. Soldiers may tire and have neck pain due to the clip-on device. By adding weight to the front of the NVG, the clip-on device moves the center of gravity further away from the neck, thereby more easily tiring the soldier, when the NVG is used for an extended period of time.

To relocate the lens and phosphor to a location beside the NVG, a fiber optic cable 50 is used, as shown in FIG. 4, to translate the image toward the front of the NVG system from the back of the phosphor plane, The fiber optic inverter may be eliminated since the optical inversion may be done with the fiber cable that translates the image.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A target engagement system comprising:
    a night vision goggle system including a microchannel plate (MCP) for amplification operating within a wavelength band,
    a laser module for projecting light onto a target, the light operating at a wavelength outside of the wavelength band, and
    a receive system for receiving the light reflected from the target and converting the light into a wavelength within the wavelength band,
    wherein the receive system provides the converted light to the MCP, and the MCP amplifies the converted light for viewing by a user; and
    the receive system includes a clip-on device for removably attaching the receive system directly on the night vision goggle system.

2. The target engagement system of claim 1 wherein the receive system is configured to up-convert the received light into a wavelength detectable by the night vision goggle system.

3. The target engagement system of claim 1 wherein the light operates at a short wave infrared (SWIR) wavelength.

4. The target engagement system of claim 1 wherein the light operates at a wavelength shorter than 400 nanometers.

5. The target engagement system of claim 1 wherein the receive system includes an up-converting phosphor layer for up-converting the received light into a wavelength detectable by the night vision goggle system.

6. The target engagement system of claim 5 wherein the receive system includes a relay objective, a fold mirror and an insertion beam combiner for relaying the received light to the night vision goggle system.

7. The target engagement system of claim 6 wherein the insertion beam combiner is configured to:
receive the up-converted light from the relay objective and the fold mirror,
receive another light directly reflected from the target, and
transmit both, the up-converted light and the other light, to the night vision goggle system.

8. The target engagement system of claim 1 wherein
the laser module is configured to operate at a wavelength greater than 950 nanometers, and
the night vision goggle system is configured to operate at a wavelength of less than 950 nanometers.

9. The target engagement system of claim 1 wherein the receive system includes
an up-converting phosphor layer for up-converting the received light into a wavelength detectable by the night vision goggle system, and
a light emitting diode (LED) for pumping the up-converted light for increased efficiency.

10. The target engagement system of claim 1 wherein the receive system includes
a fiber optic bundle for relaying the converted light directly into the night vision goggle system.

11. The target engagement system of claim 1 wherein
the light reflected from the target is invisible to the user, and the converted light is visible to the user.

12. A target engagement system comprising:
a night vision goggle system including an MCP for amplification operating within a wavelength band,
a laser module, boresighted to a weapon system, for projecting light onto a target, the light operating at a wavelength outside of the wavelength band detectable by the night vision goggle system, and
a receive system for receiving light reflected from the target and converting the light into a wavelength within the wavelength band,
wherein the receive system sends the converted light to the MCP, and
the MCP amplifies the converted light for viewing by a user.

13. The target engagement system of claim 12 wherein the receive system includes
an up-converting phosphor layer for up-converting the received light into a wavelength detectable by the night vision goggle system, and
a fold mirror and an insertion beam combiner for relaying the up-converted light to the night vision goggle system.

14. The target engagement system of claim 12 wherein
the laser module is configured to operate at a wavelength greater than 950 nanometers, and
the night vision goggle system is configured to operate at a wavelength less than 950 nanometers.

15. The target engagement system of claim 12 wherein the receive system includes
an up-converting phosphor layer for up-converting the received light into a wavelength detectable by the night vision goggle system, and
a light emitting diode (LED) for pumping the up-converted light for increased efficiency.

16. The target engagement system of claim 12 wherein the receive system includes
a fiber optic bundle for relaying the converted light directly into the night vision goggle system.

17. The target engagement system of claim 12 wherein the light reflected from the target is invisible to the user, and the converted light is visible to the user.

18. The target engagement system of claim 12 wherein the light operates at a wavelength shorter than 400 nanometers.

19. A target engagement system comprising:
an optical system including an amplifier operating within a wavelength band for amplifying a first light received from a target,
a laser module for projecting a second light onto the target, the second light operating at a wavelength outside of the wavelength band, and
a receive system for receiving the second light reflected from the target and converting the second light into a wavelength within the wavelength band to form a converted light,
wherein the receive system provides the converted light to the amplifier of the optical system, and
the amplifier amplifies both the first light and the converted light for viewing by a user.

20. The target engagement system of claim 19 wherein the receive system is configured to up-convert the received light into a wavelength detectable by the optical system.

21. The target engagement system of claim 19 wherein the light operates at a short wave infrared (SWIR) wavelength.

22. The target engagement system of claim 19 wherein the light operates at a wavelength shorter than 400 nanometers.

* * * * *